(12) United States Patent
Wang et al.

(10) Patent No.: US 11,789,109 B2
(45) Date of Patent: Oct. 17, 2023

(54) AREA DETERMINATION SYSTEM, AREA DETERMINATION METHOD, AND PROGRAM

(71) Applicant: Panasonic Intellectual Property Management Co., Ltd., Osaka (JP)

(72) Inventors: Yanfeng Wang, Osaka (JP); Nobuyuki Shibano, Hyogo (JP); Yan Rong, Shiga (JP); Masayuki Amano, Osaka (JP); Mari Nakanishi, Tokyo (JP); Kazuhiro Matsumoto, Osaka (JP); Chihiro Terayama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 54 days.

(21) Appl. No.: 17/624,427

(22) PCT Filed: Jun. 29, 2020

(86) PCT No.: PCT/JP2020/025545
§ 371 (c)(1),
(2) Date: Jan. 3, 2022

(87) PCT Pub. No.: WO2021/014897
PCT Pub. Date: Jan. 28, 2021

(65) Prior Publication Data
US 2022/0397636 A1    Dec. 15, 2022

(30) Foreign Application Priority Data
Jul. 19, 2019 (JP) .................................. 2019-134087

(51) Int. Cl.
*G01S 5/02*  (2010.01)
*G01S 3/02*  (2006.01)

(52) U.S. Cl.
CPC ...... *G01S 5/02213* (2020.05); *G01S 5/02521* (2020.05)

(58) Field of Classification Search
CPC ... G01S 5/02213; G01S 5/025221; G01S 3/02
(Continued)

(56) References Cited

U.S. PATENT DOCUMENTS

| 6,140,964 A | 10/2000 | Sugiura |
| 7,063,256 B2 * | 6/2006 | Anderson ................. B07C 3/20 |
| | | 235/385 |

(Continued)

FOREIGN PATENT DOCUMENTS

| JP | H10-51840 A | 2/1998 |
| JP | 2004-357216 A | 12/2004 |

(Continued)

OTHER PUBLICATIONS

International Search Report for corresponding Application No. PCT/JP2020/025545, dated Sep. 8, 2020.

(Continued)

*Primary Examiner* — Harry K Liu
(74) *Attorney, Agent, or Firm* — Renner, Otto, Boisselle & Sklar, LLP

(57) ABSTRACT

A first estimation unit estimates, based on pieces of information on the reception strength acquired by an acquisition unit in a first time period, a location of a transmitter. A first determination unit determines, based on the location of the transmitter estimated by the first estimation unit, an area in which the transmitter is present. A second estimation unit estimates, based on pieces of information on the reception strength acquired in a second time period, the location of the transmitter. A second determination unit determines, based on the location of the transmitter estimated by the second estimation unit, the area in which the transmitter is present.

(Continued)

A correction unit corrects, when a determination result by the first determination unit is different from a determination result by the second determination unit, the determination result by the first determination unit to the determination result by the second determination unit.

12 Claims, 6 Drawing Sheets

(58) Field of Classification Search
USPC .......................................................... 342/465
See application file for complete search history.

(56) References Cited

U.S. PATENT DOCUMENTS

| | | | |
|---|---|---|---|
| 9,635,557 B2 * | 4/2017 | Grobman | ................ G01S 19/08 |
| 2004/0239530 A1 | 12/2004 | Izumi | |
| 2007/0178922 A1 | 8/2007 | Yamada | |
| 2015/0169911 A1 | 6/2015 | Tian | |
| 2018/0084371 A1 * | 3/2018 | Scagnol | .................. H04W 4/80 |
| 2018/0266826 A1 | 9/2018 | Wang | |

FOREIGN PATENT DOCUMENTS

| | | | | |
|---|---|---|---|---|
| JP | 2007-329887 A | | 12/2007 | |
| JP | 2008-299820 A | | 12/2008 | |
| JP | 2010-66037 A | | 3/2010 | |
| JP | 2012-88237 A | | 5/2012 | |
| JP | 2014-174080 A | | 9/2014 | |
| JP | 2018-182705 A | | 11/2018 | |
| JP | 2023040075 A | * | 3/2023 | ....... H04L 29/08621 |
| WO | WO-2017079842 A1 | * | 5/2017 | .............. G01S 11/06 |

OTHER PUBLICATIONS

Written Opinion for corresponding Application No. PCT/JP2020/025545, dated Sep. 8, 2020.

* cited by examiner

AREA DETERMINATION SYSTEM, AREA DETERMINATION METHOD, AND PROGRAM

TECHNICAL FIELD

The present disclosure generally relates to area determination systems, area determination methods, and programs and specifically relates to an area determination system, an area determination method, and a program for determining an area in which a transmitter is present.

BACKGROUND ART

A Local Positioning System (LPS) including a reception unit and an LPS server has been known. The local positioning system measures the location of a portable terminal in a specific space (area) such as a target space.

The reception unit includes a plurality of receivers. The plurality of receivers are arranged in, or in the vicinity of, the target space. Each of the receivers is configured to wirelessly communicate with the portable terminal. Here, each receiver receives identification information from the portable terminal present at least in the target space via wireless communication.

Each receiver generates, based on a received radio signal, reception information regarding Received Signal Strength Indication (RSSI) of the radio signal. After receiving the radio signal from the portable terminal, each receiver transmits, to the LPS server, receiver information and the reception information in addition to the identification information received from the portable terminal. Each receiver holds receiver information assigned to itself in its nonvolatile memory or the like.

The LPS server includes a communication unit, a positioning unit, a storage, and a processor.

The communication unit receives the identification information, the receiver information, and the reception information from each of the plurality of receivers. The communication unit outputs pieces of identification information, pieces of receiver information, and pieces of reception information received from the plurality of receivers as LPS data to the positioning unit.

The positioning unit obtains, based on the LPS data (the pieces of identification information, the pieces of receiver information, and the pieces of reception information), location information representing the location of the portable terminal in the target space. The location information may be information regarding an approximate location of the portable terminal, namely, information as to whether the portable terminal is inside the target space or outside the target space.

In a local positioning system described in, for example, Patent Literature 1, a time for determination of an area in which a transmitter is present may be desirably reduced. Moreover, in the local positioning system, the accuracy of the location identified by the LPS server may be reduced due to variations or the like in reception signal strength at the receivers.

CITATION LIST

Patent Literature

Patent Literature 1: JP 2018-182705 A

SUMMARY OF INVENTION

It is an object of the present disclosure to provide an area determination system, an area determination method, and a program which enables an area in which a transmitter is present to be determined in a reduced time and the area in which the transmitter is present to be determined with an improved accuracy.

An area determination system according to an aspect of the present disclosure includes an acquisition unit, a first estimation unit, a second estimation unit, a first determination unit, a second determination unit, and a correction unit. The acquisition unit is configured to acquire information on a reception strength of a radio signal at a receiver, the radio signal being transmitted from a transmitter at a predetermined cycle. The first estimation unit is configured to estimate, based on a plurality of pieces of information on the reception strength acquired by the acquisition unit in a first time period, a location of the transmitter. The first time period is longer than the predetermined cycle. The first determination unit is configured to determine, based on the location of the transmitter estimated by the first estimation unit, an area in which the transmitter is present. The second estimation unit is configured to estimate, based on a plurality of pieces of information on the reception strength acquired by the acquisition unit in a second time period, the location of the transmitter. The second time period is longer than the first time period and partially overlaps the first time period. The second determination unit is configured to determine, based on the location of the transmitter estimated by the second estimation unit, the area in which the transmitter is present. The correction unit is configured to, when a determination result by the first determination unit is different from a determination result by the second determination unit, correct the determination result by the first determination unit to the determination result by the second determination unit.

The area determination method according to another aspect of the present disclosure includes an acquisition step, a first estimation step, a first determination step, a second estimation step, a second determination step, and a correction step. The acquisition step is a step of acquiring information on a reception strength of a radio signal at a receiver, the radio signal being transmitted from a transmitter at a predetermined cycle. The first estimation step is a step of estimating, based on a plurality of pieces of information on the reception strength acquired in a first time period, the location of the transmitter. The first time period is longer than the predetermined cycle. The first determination step is a step of determining, based on the location of the transmitter estimated by the first estimation unit, an area in which the transmitter is present. The second estimation step is a step of estimating, based on a plurality of pieces of information on the reception strength acquired in a second time period, the location of the transmitter. The second time period is longer than the first time period and partially overlaps the first time period. The second determination step is a step of determining, based on the location of the transmitter estimated by the second estimation unit, the area in which the transmitter is present. The correction step is a step of, when a determination result in the first determination step is different from a determination result in the second determination step, correcting the determination result in the first determination step to the determination result in the second determination step.

A program according to still another aspect of the present disclosure is a program configured to cause one or more processors to execute the area determination method.

DESCRIPTION OF EMBODIMENTS

Embodiment

Figure 1:
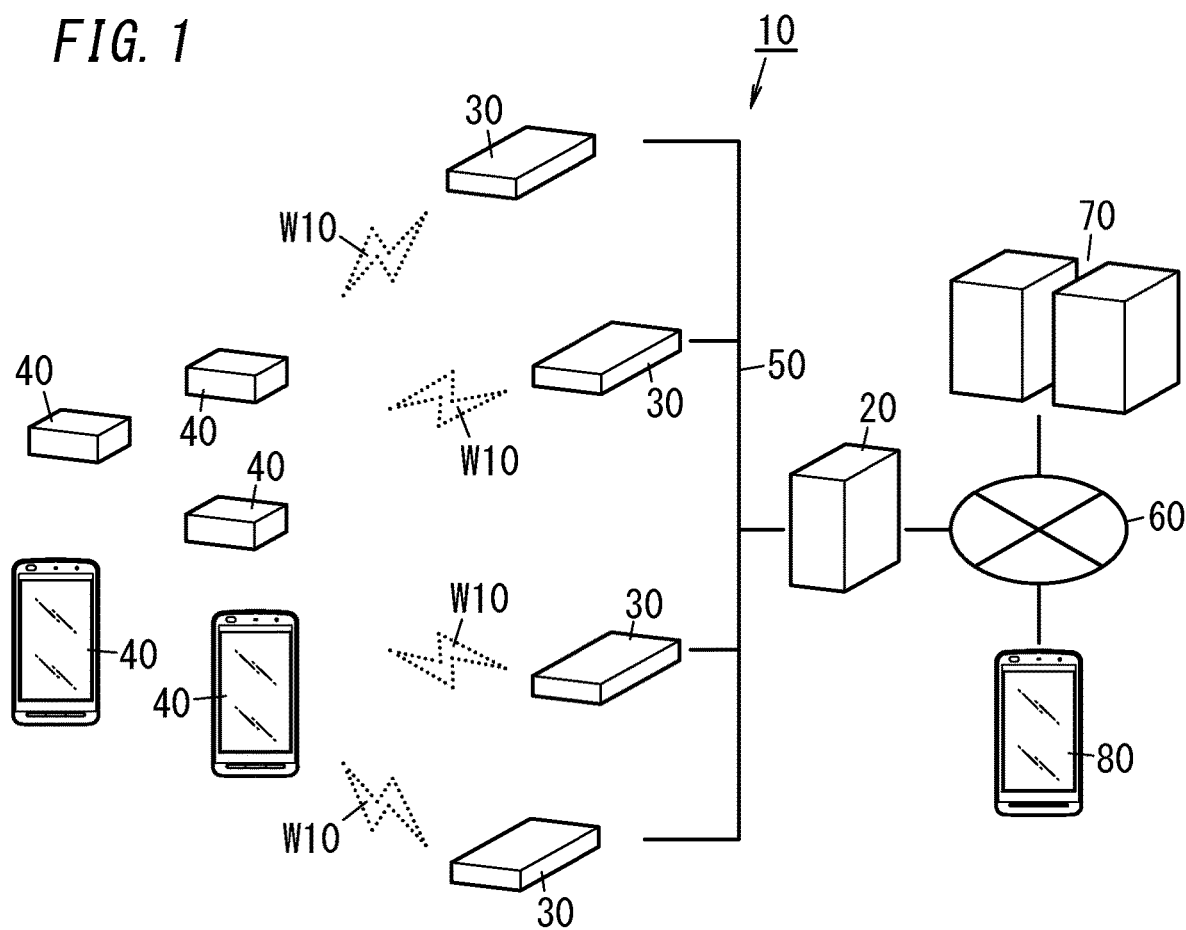
FIG. 1 is a configuration view of an area determination system according to an embodiment.

With reference to FIGS. 1 to 4, an area determination system 10 according to an embodiment will be described below.

(1) Overview

The area determination system 10 of the present embodiment includes a server 20. As shown in FIG. 2, the server 20 includes an acquisition unit 21, a first estimation unit 22, a first determination unit 24, a second estimation unit 23, a second determination unit 25, and a correction unit 26. The acquisition unit 21 acquires information on a reception strength of a radio signal W10 at a receiver 30 (see FIGS. 1 and 4), the radio signal W10 being transmitted from the transmitter 40 (see FIGS. 1 and 4) at a predetermined cycle T0 (see FIG. 4). The first estimation unit 22 estimates, based on a plurality of pieces of information on the reception strength acquired in a first time period T1 (see FIG. 4), the location of the transmitter 40. The first time period T1 is longer than the predetermined cycle T0. The first determination unit 24 determines, based on the location of the transmitter 40 estimated by the first estimation unit 22, an area in which the transmitter 40 is present. The second estimation unit 23 estimates, based on a plurality of pieces of information on the reception strength acquired in a second time period T2 (see FIG. 4), the location of the transmitter 40. The second time period T2 is longer than the first time period T1 and partially overlaps the first time period T1. The second determination unit 25 determines, based on the location of the transmitter 40 estimated by the second estimation unit 23, the area in which the transmitter 40 is present. When a determination result by the first determination unit 24 is different from a determination result by the second determination unit 25, the correction unit 26 corrects the determination result by the first determination unit 24 to the determination result by the second determination unit 25.

(2) Details

Figure 3:
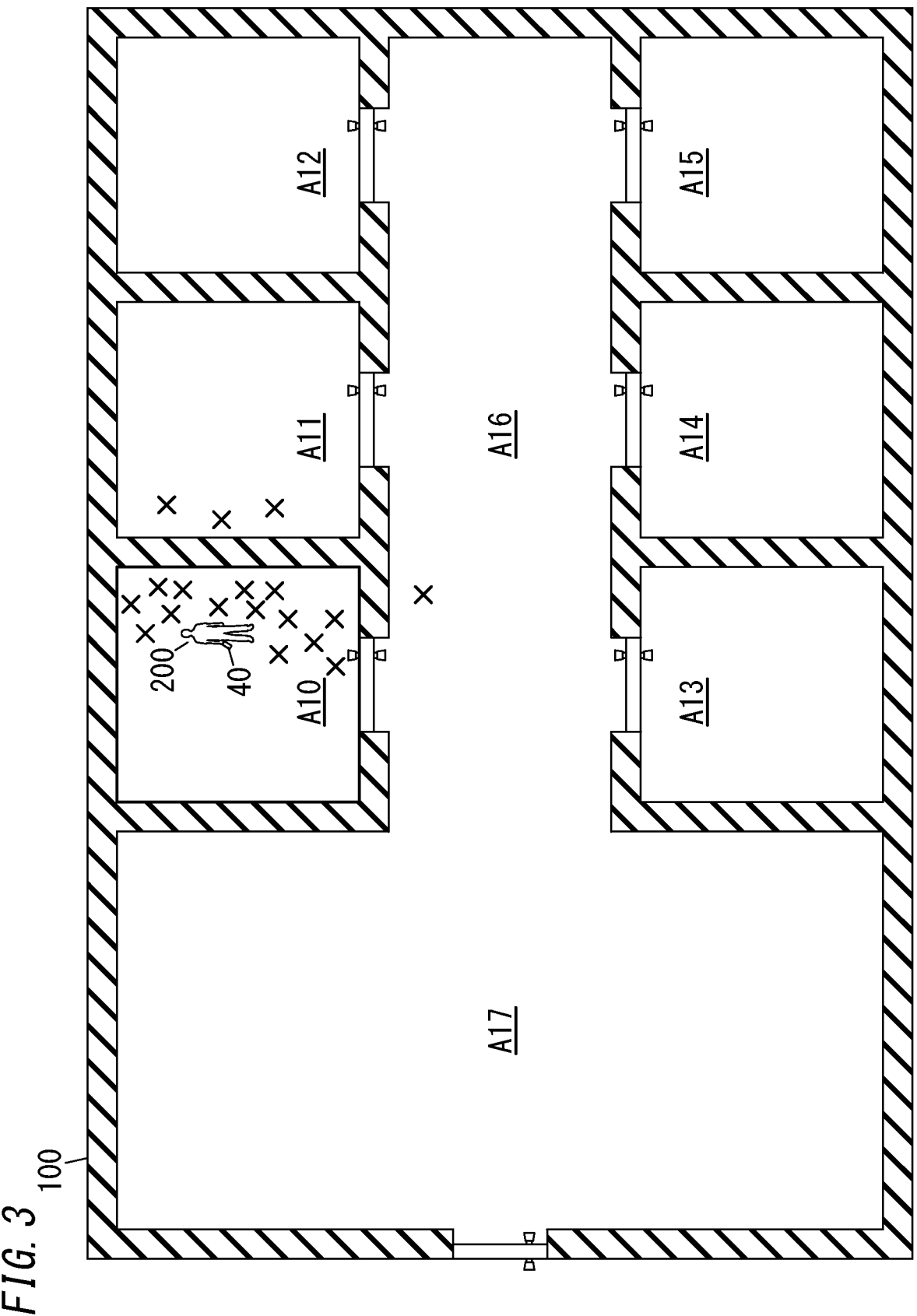
FIG. 3 is an illustrative view of an area as a determination target of the area determination system.

As shown in FIG. 3, the area determination system 10 of the present embodiment is a system for determining whether or not a person 200 holding the transmitter 40 is present in a target area in a facility 100. That is, the area determination system 10 has an aspect as a local positioning system (LPS) for identifying the position of the person 200 in the facility 100.

In the present embodiment, the facility 100 is an office building. As shown in FIG. 3, the facility 100 includes a plurality of (in the example shown in the figure, eight) areas A10 to A17. In this case, each of the areas A10 to A15 is a meeting room. The area A16 is a corridor to the areas A10 to A15, and the area A17 is a hall. Note that examples of the facility 100 include, in addition to an office building, a detached house, a multi-residential complex (residential units, a common area), a retail establishment, a building (a building as a whole, a facility on a floor of a building).

Moreover, the facility 100 is not limited to a building structure but may be premises including a building structure and its land. For example, the facility 100 may be a factory, a park, a hospital, a commercial facility, an art museum, a museum, a play facility, an entertainment park, an airport, a rail station, a domed stadium, or a hotel.

Figure 2:
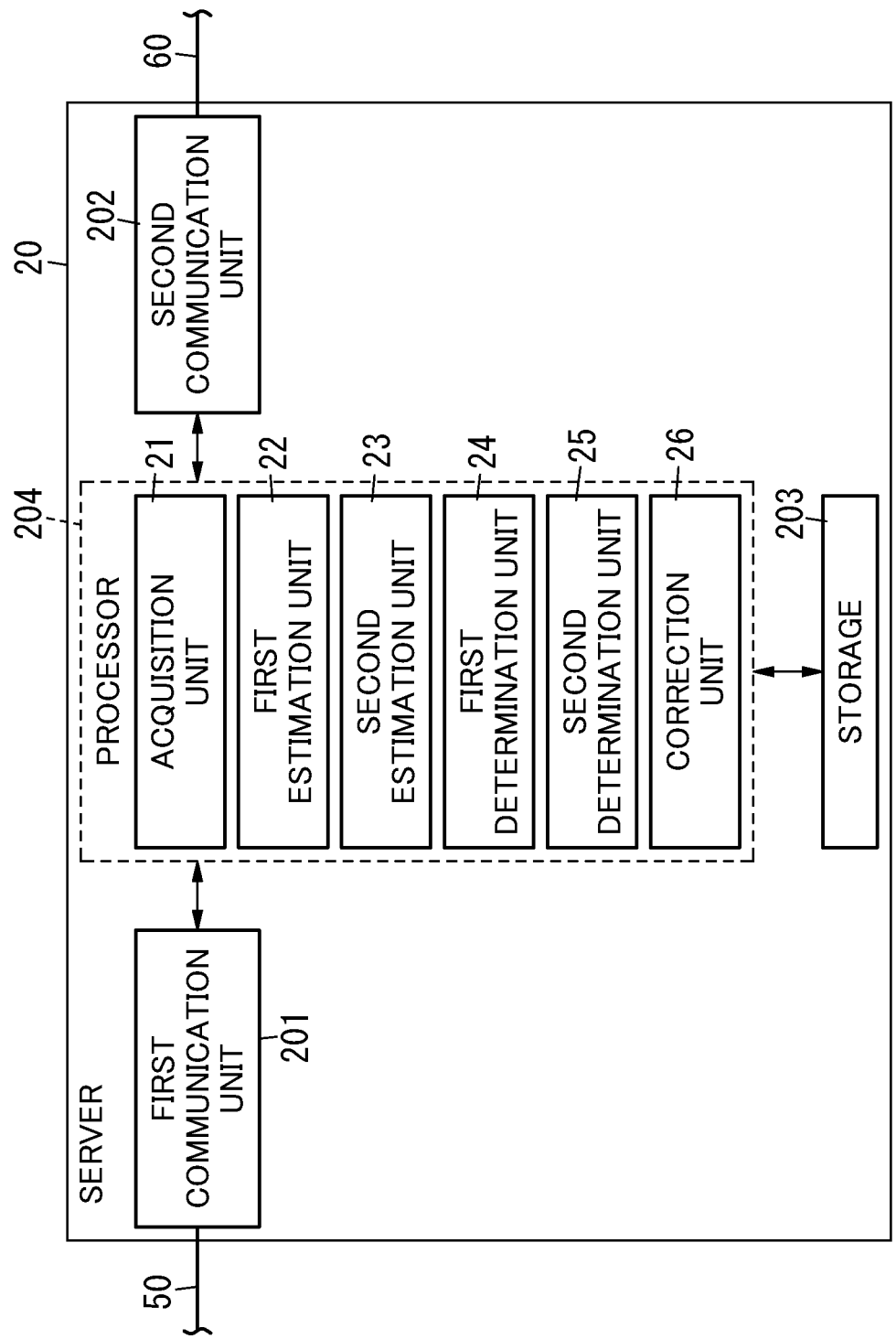
FIG. 2 is a block diagram of a server in the area determination system.

As shown in FIG. 1, the area determination system 10 includes the server 20, a plurality of receivers 30, and a plurality of transmitters 40. Moreover, the area determination system 10 is configured to communicate with a service delivery system 70 via a communication network 60. The communication network 60 may include the Internet. The communication network 60 may include a network compliant with a single communication protocol, or a plurality of networks compliant with different communication protocols. The communication protocol may be selected from well-known various wired and wireless communication standards. Although simplified in FIG. 1, the communication network 60 may include data communication devices such as a repeater hub, a switching hub, a bridge, a gateway, and a router.

The area determination system 10 is configured to provide the service delivery system 70 with a result of determination as to whether or not the person 200 holding the transmitter 40 is present in the target area in the facility 100 (presence/absence information on the person 200 in the target area in the facility 100) as necessary. The service delivery system 70 is a system for providing a terminal apparatus 80 with services. The service delivery system 70 is configured to communication with the terminal apparatus 80 via the communication network 60. The service delivery system 70 provides, based on the presence/absence information on the person 200 in the target area in the facility 100, the terminal apparatus 80 with a service of presenting various types of information. The presence/absence information is information which the service delivery system 70 has received from the area determination system 10.

The transmitter 40 is used to identify the location of the person 200. That is, provided that the person 200 carries the transmitter 40, the location of the transmitter 40 is regarded as the location of the person 200. Each transmitter 40 has a function of transmitting the radio signal W10. In particular, the transmitters 40 receives respective radio signals W10 at the predetermined cycle T0. Each radio signal W10 may include identification information on a corresponding one of the transmitters 40. The pieces of identification information are used to distinguish the plurality of transmitters 40 from each other. Each transmitter 40 stores the identification information for example, in a storage thereof. The storage is, for example, nonvolatile memory such as Electrically Erasable Programmable Read Only Memory (EEPROM).

In the present embodiment, the medium of the radio signals W10 is a radio wave. In particular, the medium of the radio signals W10 is a radio wave adapted to near field communication. Examples of the near field communication include Bluetooth (registered trademark) Low Energy. In this case, the identification information is, for example, Bluetooth (registered trademark) Device Address. The near field communication is not limited to Bluetooth (registered trademark) Low Energy but may be, for example, Wi-Fi (registered trademark). The transmitter 40 has a size and a weight portable by the person 200. The transmitter 40 is, for example, a beacon. The beacon wirelessly transmits, for example, a radio signal (a beacon signal) called an advertisement packet at predetermined time intervals and at prescribed transmission power. Moreover, the transmitters 40 may be implemented as portable terminals such as smartphones, tablet terminals, wearable terminals, or personal computers.

Each receiver 30 is used to identify the location of the transmitter 40 (i.e., the location of the person 200 carrying the transmitter 40). The receivers 30 have a function of receiving radio signals W10 from the transmitters 40. Moreover, the receivers 30 are communicatively connected to the server 20. That is, each receiver 30 is configured to communicate with the server 20 via a communication network 50. When receiving the radio signal W10 transmitted from the transmitter 40, the receiver 30 transmits the identification information included in the radio signal W10 and information on reception strength of the radio signal W10 to the server 20 via the communication network 50. The information on the reception strength of the radio signal W10 is, for example, a Received Signal Strength Indicator (RSSI). The receiver 30 transmits, for example, information on the RSSI to the server 20 in the case of the RSSI being greater than or equal to a prescribed value.

The receiver 30 is installed, for example, in a target area (e.g., at least one area of the areas A10 to A17) of the facility 100. When the target area is located indoors, the receiver 30 may be disposed on a ceiling in the target area. Moreover, a plurality of receivers 30 may be disposed in the target area. Disposing the plurality of receivers 30 is expected to improve the accuracy of identifying the location of the transmitter 40. The plurality of receivers 30 have respective pieces of identification information different from each other. The pieces of identification information on the receivers 30 are stored in, for example, nonvolatile memories of the receivers 30.

The communication network 50 may include a local area network. The communication network 50 may include a network compliant with a single communication protocol, or a plurality of networks compliant with different communication protocols. The communication protocol may be, for example, a communication protocol conforming to the standard of Ethernet (registered trademark) or a communication protocol conforming to the standard of Wi-Fi (registered trademark) or the like. Although simplified in FIG. 1, the communication network 50 may include data communication devices such as a repeater hub, a switching hub, a bridge, a gateway, and a router. Moreover, the communication network 50 may be a network of power line communication using a power line.

As shown in FIG. 2, the server 20 includes a first communication unit 201, a second communication unit 202, a storage 203, and a processor 204.

The first communication unit 201 is a communication interface. In particular, the first communication unit 201 is a communication interface connectable to the communication network 50 and has a function of performing communication via the communication network 50. That is, the server 20 is configured to communicate with the receivers 30 via the communication network 50. The first communication unit 201 receives a signal from the receiver 30 via the communication network 50 in the facility 100. The signal which the first communication unit 201 receives from the receiver 30 includes, for example, the reception strength of the radio signal W10 received by the receiver 30, the identification information on the receiver 30, the identification information on the transmitter 40, and the like. In addition, the signal which the first communication unit 201 receives from the receiver 30 may include, for example, attribute information on the person 200 who owns the transmitter 40.

The second communication unit 202 is a communication interface. In particular, the second communication unit 202 is a communication interface connectable to the communication network 60 and has a function of performing communication via the communication network 60. In particular, the second communication unit 202 is configured to communicate with the service delivery system 70 via the communication network 60. Note that the communication protocol of the second communication unit 202 may be selected from well-known various wired and wireless communication standards. The second communication unit 202 may be configured to communicate with an installation provided in the facility 100. The installation is, for example, a lighting fixture, an air conditioner, or the like.

The storage 203 is a device for storing information. The storage 203 is, for example, a Read Only Memory (ROM), a Random Access Memory (RAM), an EEPROM, or the like. The storage 203 has an area for storing information for determination. The information for determination is to be used for determination as to whether or not the transmitter 40 is present in the target area. For example, the information for determination includes information on the target area, information on the receiver 30, and information on the transmitter 40. The information on the target area is information for identifying the size, the shape, and the like of the target area. The information on the receiver 30 includes information for identifying the receiver 30 (identification information), location information on the receiver 30. The location information on the receiver 30 is given as, for example, coordinates representing the location of the receiver 30 in the facility 100. The information on the transmitter 40 includes information for identifying the transmitter 40 (identification information).

The processor 204 is configured to perform overall control of the server 20. That is, the processor 204 is configured to control the first communication unit 201, the second communication unit 202, and the storage 203. The processor 204 may be implemented as a computer system including one or more processors (microprocessors) and one or more memory elements. That is, the one or more processors execute one or more programs (applications) stored in the one or more memory elements to provide functions as the processor 204. In this embodiment, the one or more programs are stored in advance in the one or more memory elements of the processor 204. However, this is only an example and should not be construed as limiting. The one or more programs may also be downloaded via a telecommunications network such as the Internet or may be distributed after having been stored in a non-transitory storage medium such as a memory card.

In the present embodiment, the processor 204 estimates, based on the location information on the receiver 30 and the information (RSSI) on the reception strength of the radio signal W10, the location of the transmitter 40. The location information on the receiver 30 is, for example, coordinate information on the receiver 30 in the facility 100. The reception strength at the receiver 30 tends to decrease as the distance between the receiver 30 and the transmitter 40 increases. Thus, the processor 204 can estimate, based on the reception strength of the radio signal W10 at the receiver 30, the distance from the receiver 30 to the transmitter 40. From the location information, which is stored in the storage 203, on the receiver 30, the processor 204 estimates a range (e.g., a circumference with the receiver 30 as the center) within which the transmitter 40 can be present. That is, the processor 204, for example, performs, based on the location information (e.g., coordinate information in the facility 100)

on the receiver 30 and the information (RSSI) on the reception strength at the receiver 30, positioning (in this embodiment, one-point positioning) to estimate the location (coordinates) of the transmitter 40 in the facility 100. The information on the reception strength is, for example, an RSSI, more specifically, an instantaneous value of the RSSI.

For example, the processor 204 may obtain, from different receivers 30, ranges within which the transmitter 40 can be present, and the processor 204 may estimate, as the location of the transmitter 40, a location at which all the ranges overlap each other. That is, the processor 204 may estimate the location of the transmitter 40 by, for example, a three-point positioning based on the coordinate information on each of three receivers 30 and information on the reception strength at each of those three receivers 30. The three-point positioning enables the location (coordinates) of the transmitter 40 to be more accurately estimated than the one-point positioning. The three-point positioning also enables a direction in which the transmitter 40 is present with respect to the receiver 30 to be estimated. Positioning for estimating the coordinates of the transmitter 40 is not limited to the three-point positioning but may be, for example, two-point positioning or four-point positioning.

Incidentally, in FIG. 3, each of a plurality of "x" marks represents the location of the transmitter 40 estimated, when the location of the transmitter 40 is estimated based on the location information on the receiver 30 and one piece of information on the reception strength (an instantaneous value of the RSSI) received by the receiver 30. FIG. 3 shows the location of the transmitter 40 in the case where the person 200 carrying the transmitter 40 does not go out of the area A10 and does not enter the area A11 after the person 200 enters the area A10. However, due to, for example, the variation of the reception signal strength at the receiver 30, the transmitter 40 may be estimated to be present at a location in the area A16 or at a location in the area A11 as shown in FIG. 3.

The processor 204 will be described in further detail below.

As shown in FIG. 2, the processor 204 includes the acquisition unit 21, the first estimation unit 22, the second estimation unit 23, the first determination unit 24, the second determination unit 25, and the correction unit 26. In FIG. 2, the acquisition unit 21, the first estimation unit 22, the second estimation unit 23, the first determination unit 24, the second determination unit 25, and the correction unit 26 do not necessarily represent physical components but represent functions implemented by the processor 204.

Figure 4:
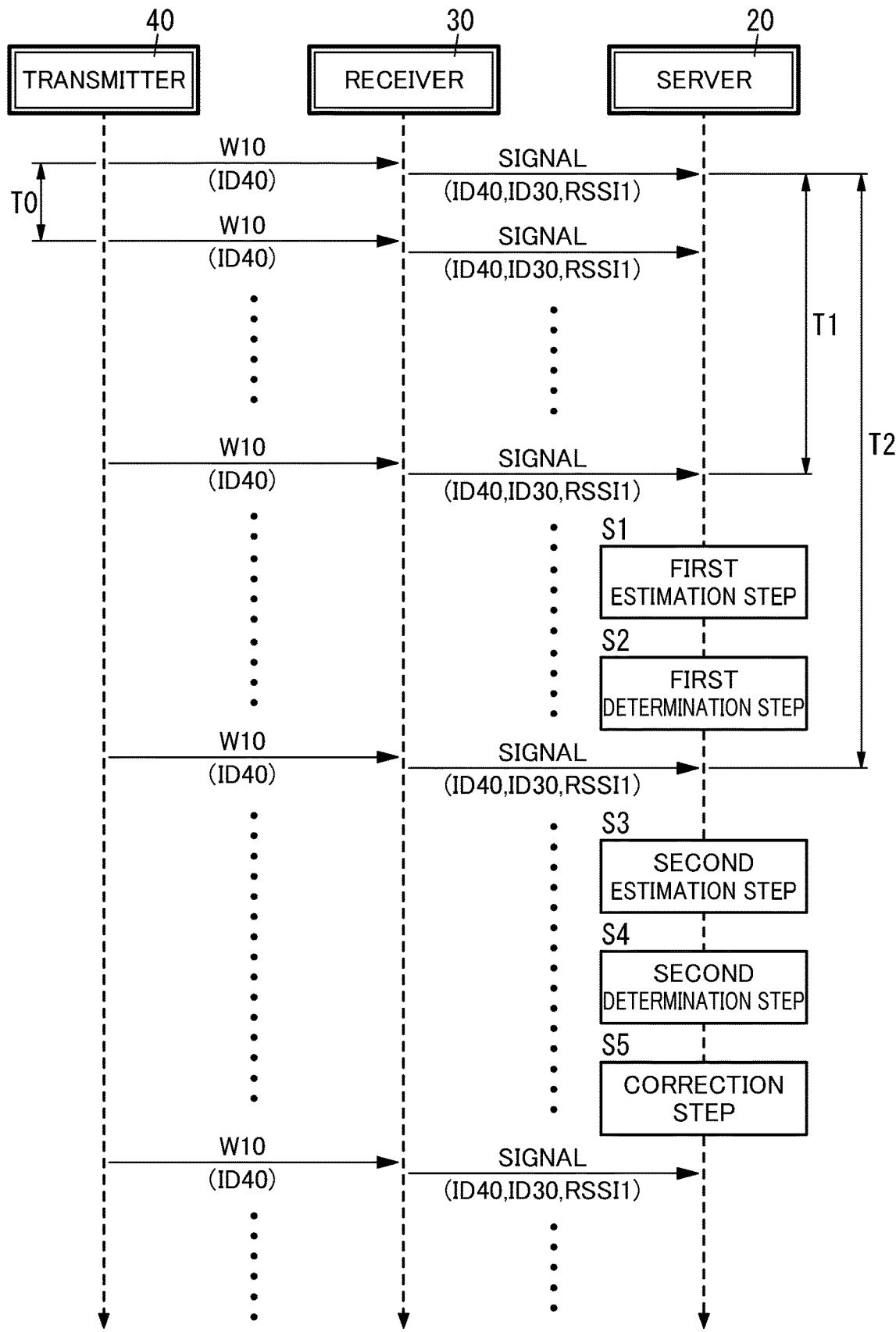
FIG. 4 is a sequence diagram of an example of operation of the area determination system.

The acquisition unit 21 acquires information (instantaneous value of the RSSI) on the reception strength of the radio signal W10 at the receiver 30, the radio signal W10 being transmitted at regular intervals from the transmitter 40 at the predetermined cycle T0 (see FIG. 4). The predetermined cycle T0 is, for example, longer than or equal to 0.1 seconds and shorter than or equal to 0.5 seconds and is, for example, 0.3 seconds.

The first estimation unit 22 estimates, based on the plurality of pieces of information on the reception strength acquired in a first time period T1 (see FIG. 4) longer than the predetermined cycle T0, the location of the transmitter 40. The first time period T1 is, for example, longer than or equal to 1 second and shorter than or equal to 5 seconds and is, for example, 3 seconds. The first estimation unit 22 obtains an average value of the plurality of (m) pieces of information on the reception strength (instantaneous values of RSSI) acquired in the first time period T1 (where "m" is a natural number) and estimates, based on the average value, the location of the transmitter 40. The location (coordinates) of the transmitter 40 estimated by the first estimation unit 22 is associated with, for example, the identification information on the transmitter 40 and the time information on the starting time point of first time period T1 and is stored in the storage 203. Here, "m" depends on the relationship between the predetermined cycle T0 and the first time period T1. For example, when the length of the first time period T1 is 3 seconds and the predetermined cycle T0 is 0.3 seconds, a maximum value which "m" can take is 11 provided that the starting time point of the first time period T1 and the starting time point of the predetermined cycle T0 are the same. "Estimating the location" means performing positioning, and, for example, when the three-point positioning is performed, an average value of a plurality of pieces of information on the reception strength is obtained for each of the three receivers 30, and based on the average value of pieces of information on the reception strength of the three receivers 30, the three-point positioning of the transmitter 40 is performed.

The first determination unit 24 determines, based on the location of the transmitter 40 estimated by the first estimation unit 22, an area in which the transmitter 40 is present. In this case, the first determination unit 24 determines, based on, for example, the location (coordinates) of the transmitter 40 estimated by the first estimation unit 22 and the coordinates of each area stored in the storage 203, the area in which the transmitter 40 is present. For example, if the coordinates of the transmitter 40 estimated by the first estimation unit 22 are included in the coordinate range of the area A10, the first determination unit 24 determines that the transmitter 40 is present in the area A10. The information on the area determined by the first determination unit 24 is associated with, for example, the identification information on the transmitter 40 and the time information on the starting time point of first time period T1 and is stored in the storage 203.

The second estimation unit 23 estimates, based on the plurality of pieces of information on the reception strength acquired in the second time period T2 (see FIG. 4) longer than the first time period T1 and partially overlapping the first time period T1, the location of the transmitter 40. The second time period T2 is, for example, longer than or equal to 20 seconds and shorter than or equal to 5 minutes and is, for example, 30 seconds. The second estimation unit 23 obtains an average value of a plurality of (n) pieces of information on the reception strength (instantaneous values of RSSI) acquired in the third time period T3 (where "n" is a natural number and n≥m) and estimates, based on the average value, the location of the transmitter 40. The location (coordinates) of the transmitter 40 estimated by the second estimation unit 23 is associated with, for example, the identification information on the transmitter 40 and the time information on the starting time point of second time period T2 and is stored in the storage 203. Here, "n" depends on the relationship between the predetermined cycle T0 and the second time period T2. For example, when the length of the second time period T2 is 30 seconds and the predetermined cycle T0 is 0.3 seconds, a maximum value which "n" can take is 101 provided that the starting time point of the second time period T2 and the starting time point of the predetermined cycle T0 are the same. The value of "n" is preferably larger than the value of "m". "Estimating the location" means performing positioning, and, for example, when the three-point positioning is performed, an average value of a plurality of pieces of information on the reception strength is obtained for each of the three receivers 30, and based on the average value of pieces of information on the reception strength of the three receivers 30, the three-point positioning of the transmitter 40 is performed. The second estimation unit 23 tends to use, for evaluation of the location of the transmitter 40, a larger number of pieces of information on the reception strength than the first estimation unit 22. Thus, for example, if the area is a meeting room, an executive room, or the like and the person 200 who once enters the area rarely goes out of the area, the estimation accuracy of the location of the transmitter 40 can be improved more in the second estimation unit 23 than in the first estimation unit 22.

The second determination unit 25 determines, based on the location of the transmitter 40 estimated by the second estimation unit 23, the area in which the transmitter 40 is present. In this case, the second determination unit 25 determines, based on, for example, the location (coordinates) of the transmitter 40 estimated by the second estimation unit 23 and the coordinate of each area stored in the storage 203, the area in which the transmitter 40 is present. For example, if the coordinates of the transmitter 40 estimated by the second estimation unit 23 are included in the coordinate range of the area A10, the second determination unit 25 determines that the transmitter 40 is present in the area A10. The information on the area determined by the second determination unit 25 is associated with, for example, the identification information on the transmitter 40 and the time information on the starting time point of second time period T2 and is stored in the storage 203. The second determination unit 25 tends to use, for evaluation of the location of the transmitter 40, a larger number of pieces of information on the reception strength than the first determination unit 24. Thus, for example, if the area is a meeting room, an executive room, or the like and the person 200 who once enters the area rarely goes out of the area, the estimation accuracy of the location of the transmitter 40 can be improved more in the second determination unit 25 than in the first determination unit 24.

When a determination result by the first determination unit 24 is different from a determination result by the second determination unit 25, the correction unit 26 corrects the determination result by the first determination unit 24 to the determination result by the second determination unit 25. The correction unit 26 compares, for example, for the first time period T1 and the second time period T2 having the same starting time point, a determination result by the first determination unit 24 to a determination result by the second determination unit 25, and if the determination result by the first determination unit 24 is different from the determination result by the second determination unit 25, the correction unit 26 corrects the determination result by the first determination unit 24 to the determination result by the second determination unit 25. For example, if the first determination unit 24 determines that the area in which the transmitter 40 is present is the area A11 and the second determination unit 25 determines that the area in which the transmitter 40 is present is the area A10, the correction unit 26 corrects the determination result by the first determination unit 24 stored in the storage 203 to the area A10.

(3) Operation

With reference to FIG. 4, an example of operation of the area determination system 10 will be described below. Note that in FIG. 4, "W10" indicates the radio signal output from the transmitter 40, "ID40" indicates the identification information which is included in the radio signal W10 and which is on the transmitter 40, "ID30" indicates the identification information on the receiver 30, and "RSSI1" indicates the instantaneous value of the RSSI, and the instantaneous value is included in the information on the reception strength at the receiver 30.

The transmitter 40 transmits the radio signal W10 including the identification information (ID40) on the transmitter 40 at the predetermined cycle T0. That is, the transmitter 40 outputs the radio signal W10 at regular intervals (output step).

When the person 200 carrying the transmitter 40 comes close to the receiver 30 installed in an area (target area) to be determined, the receiver 30 receives the radio signal W10 output from the transmitter 40, and if the reception strength is greater than or equal to the prescribed reception strength (e.g., −85 dB), the receiver 30 executes transmission step of transmitting to the server 20 a signal including the identification information (ID40) on the transmitter 40, the identification information (ID30) on the receiver 30, and the information (RSSI1) on the reception strength. The receiver 30 executes the transmission step each time the receiver 30 receives the radio signal W10 transmitted from the transmitter 40.

The server 20 executes the acquisition step of acquiring information (RSSI1) on the reception strength of the radio signal W10 at the receiver 30, the radio signal W10 being transmitted from the transmitter 40 at the predetermined cycle T0. The acquisition step is executed by the acquisition unit 21 described above (see FIG. 2).

The server 20 executes the first estimation step S1 of estimating, based on a plurality of (m) pieces of information (RSSI1) on the reception strength received in the first time period T1 longer than the predetermined cycle T0, the location of the transmitter 40. The first estimation step S1 is executed by the first estimation unit 22 described above (see FIG. 2).

The server 20 executes the first determination step S2 of determining, based on the location of the transmitter 40 estimated in the first estimation step S1, the area in which the transmitter 40 is present. The first determination step S2 is executed by the first determination unit 24 described above (see FIG. 2).

The server 20 executes the second estimation step S3 of estimating, based on a plurality of (n) pieces of information (RSSI1) on the reception strength acquired in the second time period T2 longer than the first time period T1 and partially overlapping the first time period T1, the location of the transmitter 40. The second estimation step S3 is executed by the second estimation unit 23 described above.

The server 20 executes the second determination step S4 of determining, based on the location of the transmitter 40 estimated in the second estimation step S3, the area in which the transmitter 40 is present. The second determination step S4 is executed by the second determination unit 25 described above (see FIG. 2).

The server 20 executes the correction step S5 of, when the determination result in the first determination step S2 is different from the determination result in the second determination step S4, correcting the determination result in the first determination step S2 to the determination result in the second determination step S4. The correction step S5 is executed by the correction unit 26 described above (see FIG. 2).

The first estimation step S1, the first determination step S2, the second estimation step S3, the second determination step S4, and the correction step S5 are repeatedly executed.

(4) Summary

The area determination system 10 of the present embodiment includes the acquisition unit 21, the first estimation unit 22, the second estimation unit 23, the first determination unit 24, the second determination unit 25, and the correction unit 26. The acquisition unit 21 is configured to acquire the information (RSSI1) on the reception strength of the radio signal W10 at the receiver 30, the radio signal W10 being output from the transmitter 40 at the predetermined cycle T0. The first estimation unit 22 estimates, based on a plurality of (m) pieces of information (RSSI1) on the reception strength acquired in the first time period T1 by the acquisition unit 21, the location of the transmitter 40. The first time period T1 is longer than the predetermined cycle T0. The first determination unit 24 determines, based on the location of the transmitter 40 estimated by the first estimation unit 22, the area in which the transmitter 40 is present. The second estimation unit 23 estimates, based on a plurality of (n) pieces of information (RSSI1) on the reception strength acquired by the acquisition unit 21 in the second time period T2 (where, n≥m), the location of the transmitter 40. The second time period T2 is longer than the first time period T1 and partially overlaps the first time period T1. The second determination unit 25 determines, based on the location of the transmitter 40 estimated by the second estimation unit 23, the area in which the transmitter 40 is present. When a determination result by the first determination unit 24 is different from a determination result by the second determination unit 25, the correction unit 26 corrects the determination result by the first determination unit 24 to the determination result by the second determination unit 25.

Thus, the area determination system 10 of the present embodiment enables the area in which the transmitter 40 is present to be determined in a reduced time and the area in which the transmitter 40 is present to be determined with a further improved accuracy. Here, in the area determination system 10 of the present embodiment, the first determination unit 24 determines the area in which the transmitter 40 is present in a time shorter than a time in the case of the second determination unit 25, and the correction unit 26 is provided, which eventually enables the area in which the transmitter 40 is presence to be more accurately determined.

In other words, the area determination system 10 executes the following method (area determination method). The area determination method includes the acquisition step, the first estimation step S1, the first determination step S2, the second estimation step S3, the second determination step S4, and the correction step S5. The acquisition step is a step of acquiring the information on the reception strength of the radio signal W10 at the receiver 30, the radio signal W10 being transmitted from the transmitter 40 at the predetermined cycle T0. The first estimation step S1 is a step of estimating, based on a plurality of pieces of information on the reception strength acquired in the first time period T1 longer than the predetermined cycle T0, the location of the transmitter 40. The first determination step S2 is a step of determining, based on the location of the transmitter 40 estimated in the first estimation step S1, the area in which the transmitter 40 is present. The second estimation step S3 is a step of estimating, based on a plurality of pieces of information on the reception strength acquired in a second time period T2, the location of the transmitter 40. The second time period T2 is longer than the first time period T1 and partially overlaps the first time period T1. The second determination step S4 is a step of determining, based on the location of the transmitter 40 estimated in the second estimation step S3, the area in which the transmitter 40 is present. The correction step S5 is a step of, when a determination result in the first determination step S2 is different from a determination result in the second determination step S4, correcting the determination result in the first determination step S2 to the determination result in the second determination step S4. This area determination method enables the area in which the transmitter 40 is present to be determined in a reduced time and the area in which the transmitter 40 is present to be determined with a further improved accuracy.

The area determination system 10 includes one or more processors. That is, the area determination system 10 is realized by a program (area determination program) executed by the one or more processors. This program is a program (computer program) for causing the one or more processors to execute the area determination method. This program enables the area in which the transmitter 40 is present to be determined in a reduced time and the area in which the transmitter 40 is present to be determined with a further improved accuracy in a similar manner to the area determination method.

(Variations)

The embodiment in the present disclosure is not limited to the embodiment described above. Rather, the embodiment described above may be readily modified in various manners depending on a design choice or any other factor without departing from the scope of the present disclosure. Variations of the embodiment described above will be enumerated below.

Figure 5:
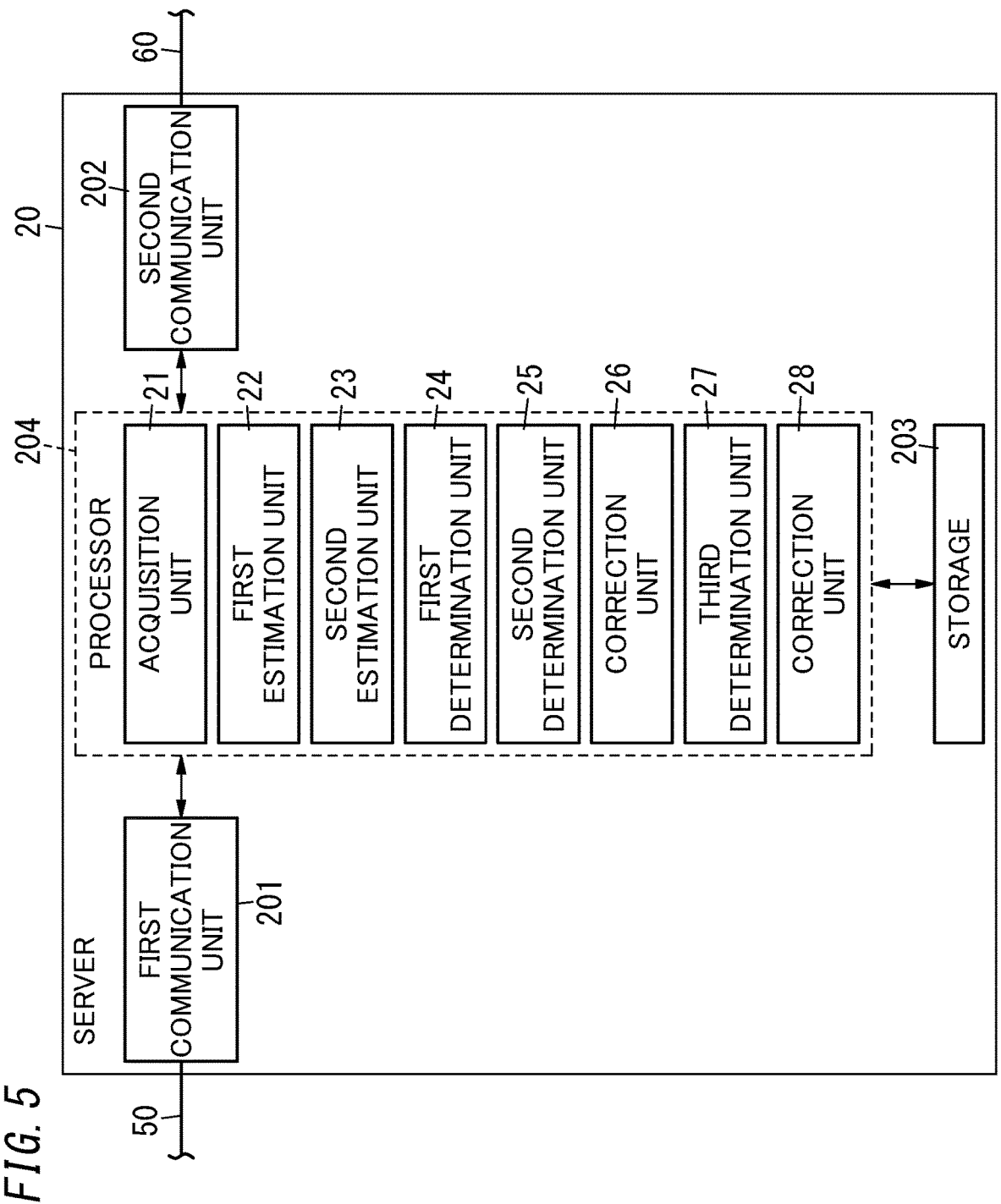
FIG. 5 is a block diagram of a server in an area determination system of a variation.
Figure 6:
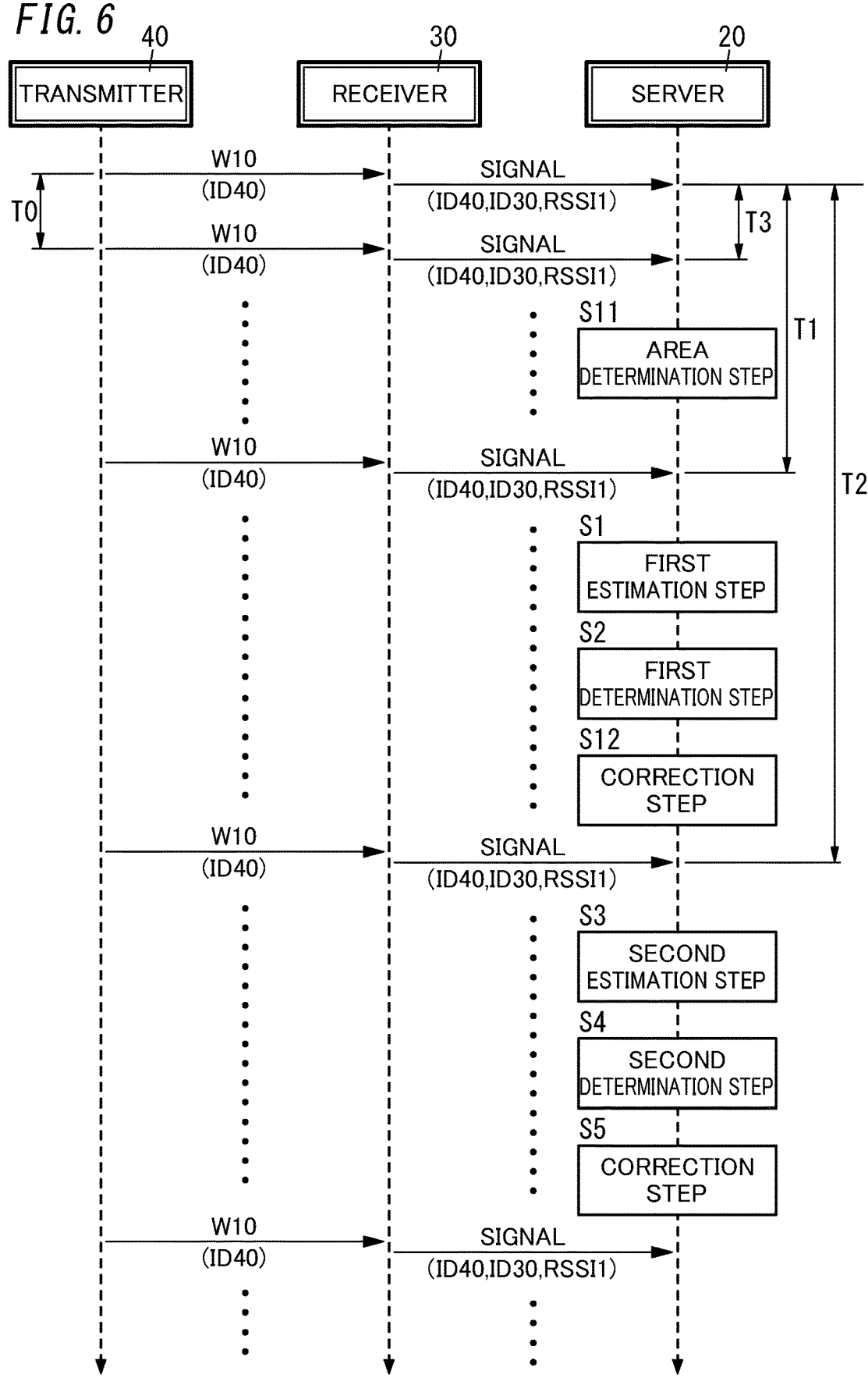
FIG. 6 is a sequence diagram of an example of operation of the area determination system.

In a variation, the processor 204 may further include a third determination unit 27 as shown in FIG. 5. The third determination unit 27 determines, based on at least one piece of information on the reception strength acquired in a third time period T3 (see FIG. 6) shorter than the first time period T1 (see FIG. 6), the area in which the transmitter 40 is present. That is, the server 20 executes by the third determination unit 27 the area determination step S11 (see FIG. 6) of determining, based on the at least one piece of information on the reception strength acquired by the acquisition unit 21 in the third time period T3 shorter than the first time period T1, the area in which the transmitter 40 is present. The information on the area determined by the third determination unit 27 is associated with, for example, the identification information on the transmitter 40 and the time information on the starting time point of the third time period T3 and is stored in the storage 203. The third determination unit 27 preferably determines, based on one piece to three pieces of information on the reception strength, the area in which the transmitter 40 is present, for example, to improve the real time properties of the area determination. The third determination unit 27 obtains, based on the coordinate information on the receiver 30 in the facility 100 and the RSSI1, the distance from the receiver 30 to the transmitter 40. The third determination unit 27 can acquire, based on, for example, the identification information on the receiver 30 included in the signal from the receiver 30, the coordinate information on the receiver 30 in the facility 100 from the storage 203. The third determination unit 27 determines the area in which an area within a circumference having a radius corresponding to the distance is present with the coordinates of the receiver 30 as the center. The area in which the transmitter 40 is present and which is determined by the third determination unit 27 is the area in which the transmitter 40 is present substantially in real time.

In another variation, the first time period T1 is set to partially overlap the third time period T3. The starting time point of the third time period T3 is preferably the same as the starting time point of the first time period T1. The processor 204 may further include a correction unit 28 (hereinafter also referred to as a second correction unit 28) other than the correction unit 26 described above (hereinafter also referred to as a first correction unit 26). When a determination result by the third determination unit 27 is different from a determination result by the first determination unit 24, the second correction unit 28 corrects the determination result by the third determination unit 27 to the determination result by the first determination unit 24. More specifically, the second correction unit 28 corrects the determination result by the third determination unit 27 stored in the storage 203 to the determination result by the first determination unit 24. That is, the server 20 executes, by the second correction unit 28, the correction step S12 (see FIG. 6) of correcting, when a determination result by the third determination unit 27 is different from a determination result by the first determination unit 24, the determination result by the third determination unit 27 to the determination result by the first determination unit 24. Thus, since the area determination system 10 includes the second correction unit 28, the area determination system 10 can determine the area in which the transmitter 40 is present with further improved accuracy.

In another variation, the area determination system 10 may define each of two or more of the plurality of areas A10 to A17 in the facility 100 as target areas. That is, the area determination system 10 may determine whether or not the transmitter 40 is present in a plurality of target areas. Alternatively, a target area may include the plurality of areas A10 to A17. In the facility 100 shown in FIG. 3, the areas A16 and A17 may be collectively defined as one target area. Moreover, in the facility 100 shown in FIG. 3, the areas A10, A11, and A12 may be collectively defined as one target area. That is, the target area is not one separated space but may include a plurality of separated spaces. Thus, the target area may be set in accordance with the characteristics and/or the shape of the facility 100.

In another variation, the server 20 does not necessarily have to include the second communication unit 202. The server 20 may include an outputter additionally or alternatively to the second communication unit 202. The outputter is configured to output a result of determination as to whether or not the transmitter 40 is present in the target area. The outputter has at least a function of presenting the result of the determination by at least one of a sound or display. Examples of the outputter include a loudspeaker and a display.

In another variation, the radio signal transmitted from the transmitter 40 may include, in addition to the identification information on the transmitter 40, attribute information representing the attribute of the person 200 who carries the transmitter 40. For example, when an employee who works in an office in the facility 100 is allowed to carry the transmitter 40, the radio signal may include information for identifying the employee (e.g., employee number).

In another variation, the area determination system 10 may include one or more receivers 30 and one or more transmitters 40. However, the one or more transmitters 40 are not essential. Moreover, the one or more receivers 30 are also not essential. In sum, the area determination system 10 does not have to include the receiver 30 or the transmitter 40. That is, the area determination system 10 at least includes the server 20, and more specifically, the area determination system 10 at least includes the acquisition unit 21, the first estimation unit 22, the first determination unit 24, the second estimation unit 23, the second determination unit 25, and the correction unit 26.

In another variation, the area determination system 10 (server 20) may include a plurality of computers. For example, the functions (in particular, the acquisition unit 21, the first estimation unit 22, the second estimation unit 23, the first determination unit 24, the second determination unit 25, and the correction unit 26) of the area determination system 10 (server 20) may be distributed in a plurality of devices. Moreover, at least some of the functions of the area determination system 10 (server 20) may be realized by, for example, the cloud (cloud calculating).

An execution subject of the area determination system 10 (server 20) described above includes a computer system. The computer system includes, as hardware, a processor and memory. The functions as the execution subject of the area determination system 10 (server 20) according to the present disclosure may be realized by making the processor execute a program stored in the memory of the computer system. The program may be stored in the memory of the computer system in advance or may be provided over a telecommunications network. Alternatively, the program may also be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a largescale integrated circuit (LSI). A field programmable gate array (FPGA), or an application specific integrated circuit (ASIC), programmable after the manufacturing of an LSI or a reconfigurable logical device that allows reconfiguration of a connection relationship in the interior of an LSI or setup of a circuit section in the interior of the LSI may also be used for the same purpose. The plurality of electronic circuits may be collected on one chip or may be distributed on a plurality of chips. The plurality of chips may be collected in one device or may be distributed in a plurality of devices.

(Aspect)

The embodiment and the like described above disclose the following aspects in the present specification. In the following description, reference signs in parentheses are added only to clarify the correspondence relationship to the embodiment.

An area determination system (10) of a first aspect includes an acquisition unit (21), a first estimation unit (22), a second estimation unit (23), a first determination unit (24), a second determination unit (25), and a correction unit (26). The acquisition unit (21) is configured to acquire information on a reception strength of a radio signal (W10) at a receiver (30), the radio signal (W10) being transmitted from a transmitter (40) at a predetermined cycle (T0). The first estimation unit (22) is configured to estimate, based on a plurality of pieces of information on the reception strength acquired in a first time period (T1), a location of the transmitter (40). The first time period (T1) is longer than the predetermined cycle (T0). The second estimation unit (23) is configured to estimate, based on a plurality of pieces of information on the reception strength acquired in a second time period (T2), the location of the transmitter (40). The second time period (T2) is longer than the first time period (T1) and partially overlaps the first time period (T1). The first determination unit (24) is configured to determine, based on the location of the transmitter (40) estimated by the first estimation unit (22), an area in which the transmitter (40) is present. The second determination unit (25) is configured to determine, based on the location of the transmitter (40) estimated by the second estimation unit (23), the area in which the transmitter (40) is present. The correction unit (26) is configured to, when a determination result by the first determination unit (24) is different from a determination result by the second determination unit (25), correct the determination result by the first determination unit (24) to the determination result by the second determination unit (25).

The area determination system (10) of the first aspect enables the area in which the transmitter (40) is present to be determined in a reduced time and the area in which the transmitter (40) is present to be determined with an improved accuracy.

An area determination system (10) of a second aspect referring to the first aspect further includes a third determination unit (27). The third determination unit (27) is configured to determine, based on at least one piece of information on the reception strength acquired in a third time period (T3) shorter than the first time period (T1), the area in which the transmitter (40) is present.

The area determination system (10) of the second aspect enables the area in which the transmitter (40) is present to be determined in a further reduced time, thereby improving real time properties.

In an area determination system (10) of a third aspect referring to the second aspect, the first time period (T1) is set to partially overlap the third time period (T3). The area determination system (10) of the third aspect further includes a correction unit (28). The correction unit (28) is configured to, when a determination result by the third determination unit (27) is different from a determination result by the first determination unit (24), correct the determination result by the third determination unit (27) to the determination result by the first determination unit (24).

The area determination system (10) of the third aspect enables the area in which the transmitter (40) is present to be determined with a further improved accuracy.

An area determination system (10) of a fourth aspect referring to any one of the first to third aspects further includes the receiver (30).

An area determination system (10) of a fifth aspect referring to the fourth aspect includes a plurality of the receivers (30).

An area determination system (10) of a sixth aspect referring to any one of the first to fifth aspects further includes the transmitter (40).

The constituent elements of the second to sixth aspects are not essential constituent elements for the area determination system (10) but may be omitted as appropriate.

The area determination method of a seventh aspect includes an acquisition step, a first estimation step (S1), a first determination step (S2), a second estimation step (S3), a second determination step (S4), and a correction step (S5). The acquisition step is a step of acquiring information on a reception strength of a radio signal (W10) at a receiver (30), the radio signal (W10) being transmitted from a transmitter (40) at a predetermined cycle (T0). The first estimation step (S1) is a step of estimating, based on a plurality of pieces of information on the reception strength acquired in a first time period (T1), a location of the transmitter (40). The first time period (T1) is longer than the predetermined cycle (T0). The first determination step (S2) is a step of determining, based on the location of the transmitter (40) estimated in the first estimation step (S1), an area in which the transmitter (40) is present. The second estimation step (S3) is a step of estimating, based on a plurality of pieces information on the reception strength acquired in a second time period (T2), the location of the transmitter (40). The second time period (T2) is longer than the first time period (T1) and partially overlaps the first time period (T1). The second determination step (S4) is a step of determining, based on the location of the transmitter (40) estimated in the second estimation step (S3), the area in which the transmitter (40) is present. The correction step (S5) is a step of, when a determination result in the first determination step (S2) is different from a determination result in the second determination step (S4), correcting the determination result in the first determination step S2 to the determination result in the second determination step (S4).

The area determination method of the seventh aspect enables the area in which the transmitter (40) is present to be determined in a reduced time and the area in which the transmitter (40) is present to be determined with an improved accuracy.

A program of an eighth aspect is a program configured to cause one or more processors to execute the area determination method of the seventh aspect.

The program of the eighth aspect enables the area in which the transmitter (40) is present to be determined in a reduced time and the area in which the transmitter (40) is present to be determined with an improved accuracy.

REFERENCE SIGNS LIST

10 Area Determination System
20 Server
21 Acquisition Unit
22 First Estimation Unit
23 Second Estimation Unit
24 First Determination Unit
25 Second Determination Unit
26 Correction Unit
27 Third Determination Unit
28 Correction Unit
30 Receiver
40 Transmitter
T0 Predetermined Cycle
T1 First Time Period
T2 Second Time Period
T3 Third Time Period
W10 Radio Signal

The invention claimed is:
1. An area determination system, comprising:
a computer system,
the computer system, includes:
an acquisition unit configured to acquire information on a reception strength of a radio signal at a receiver in a facility, the radio signal being transmitted from a transmitter at a predetermined cycle,
identification information of the receiver, and
identification information of the transmitter;
a first estimation unit configured to estimate, based on a plurality of pieces of information on the reception strength acquired by the acquisition unit in a first time period, a location of the transmitter in the facility as estimated by the first estimation unit, the first time period being longer than the predetermined cycle;
a first determination unit configured to determine, based on the location of the transmitter in the facility estimated by the first estimation unit, a first candidate area in which the transmitter is present in the facility;
a second estimation unit configured to estimate, based on a plurality of pieces information on the reception strength acquired by the acquisition unit in a second time period, a location of the transmitter in the facility as estimated by the second estimation unit, the second time period being longer than the first time period and partially overlapping the first time period;

a second determination unit configured to determine, based on the location of the transmitter estimated by the second estimation unit, a second candidate area in which the transmitter is present in the facility; and a correction unit configured to, when a determination result by the first determination unit is different from a determination result by the second determination unit, correct the determination result by the first determination unit to the determination result by the second determination unit.

2. The area determination system of claim 1, further comprising a third determination unit configured to determine, based on at least one piece of information on the reception strength acquired in a third time period shorter than the first time period, the area in which the transmitter is present in the facility.

3. The area determination system of claim 2, wherein the first time period is set to partially overlap the third time period, and the area determination system of further includes a correction unit configured to, when a determination result by the third determination unit is different from a determination result by the first determination unit, correct the determination result by the third determination unit to the determination result by the first determination unit.

4. The area determination system of claim 1, further comprising the receiver.

5. The area determination system of claim 4, comprising a plurality of the receivers.

6. The area determination system of claim 1, further comprising the transmitter.

7. An area determination method configured to be executed by a computer system, comprising:

an acquisition step of acquiring information on a reception strength of a radio signal at a receiver in a facility, the radio signal being transmitted from a transmitter at a predetermined cycle;

identification information on the receiver, and identification information on the transmitter;

a first estimation step of estimating, based on a plurality of pieces of information on the reception strength acquired in a first time period, a location of the transmitter in the facility, the first time period being longer than the predetermined cycle;

a first determination step of determining, based on the location of the transmitter estimated in the first estimation step, an area in which the transmitter is present in the facility;

a second estimation step of estimating, based on a plurality of pieces of information on the reception strength acquired in a second time period, the location of the transmitter in the facility, the second time period being longer than the first time period and partially overlapping the first time period;

a second determination step of determining, based on the location of the transmitter estimated in the second estimation step, the area in which the transmitter is present in the facility; and a correction step of, when a determination result in the first determination step is different from a determination result in the second determination step, correcting the determination result in the first determination step to the determination result in the second determination step.

8. A non-transitory storage medium storing a program configured to cause one or more processors to execute the area determination method of claim 7.

9. The area determination system of claim 2, further comprising the receiver.

10. The area determination system of claim 3, further comprising the receiver.

11. The area determination system of claim 9, comprising a plurality of the receivers.

12. The area determination system of claim 10, comprising a plurality of the receivers.

* * * * *